March 3, 1942.  A. J. TROTT  2,274,876

VALVE

Filed July 18, 1940

INVENTOR.
Arthur J. Trott
BY
Albert J. Henderson
ATTORNEY.

Patented Mar. 3, 1942

2,274,876

UNITED STATES PATENT OFFICE 2,274,876

VALVE

Arthur J. Trott, Greensburg, Pa., assignor to Walworth Patents Inc., Boston, Mass., a corporation of Massachusetts Application July 18, 1940, Serial No. 346,091

2 Claims. (Cl. 251—155)

This invention relates to valves and more particularly to valves for high pressure and high temperature services.

Considerable difficulty has been experienced with valves for high pressure and high temperature conditions due to leakage at the joints. Valves for this class of service have usually been provided with a body having the fluid passages therein and a separate bonnet carrying the valve stem assembly. The joint between the body and the bonnet has been difficult to keep tight against leakage of the fluid under high pressures. The elevated temperatures often accompanying such pressures have served to aggravate the existing conditions.

These troubles have existed not only in the case of cast metal valves. The problem has not been solved by the introduction of wrought metal valves having fluid passages machined therein and leaving comparatively massive sections of metal therearound to withstand the high pressures. This expedient has permitted operation under higher pressures and temperatures than in the case of cast metal valves in the same size range but manufacturing limitations have made it necessary that the body and bonnet be made in two or more pieces. These valves have thus presented the same problem of leakage as the cast metal valves. Moreover, only extremely small size valves could be made economically in this manner.

It is an object of this invention to eliminate the usual joint between the body and bonnet of valves.

Another object of the invention is to permit assembly and disassembly of the valves with facility equal or superior to valves having bonnet joints.

Another object of the invention is to provide for ready accessibility to the inner parts of the valve for inspection and repair.

Another object of the invention is to provide a substantially constructed valve suitable for use over a wide range of pressure and temperature conditions and which will be economical to manufacture and inexpensive to purchase.

Other objects and advantages will become apparent from the following description taken in connection with the accompanying drawing wherein.

Figure 1:
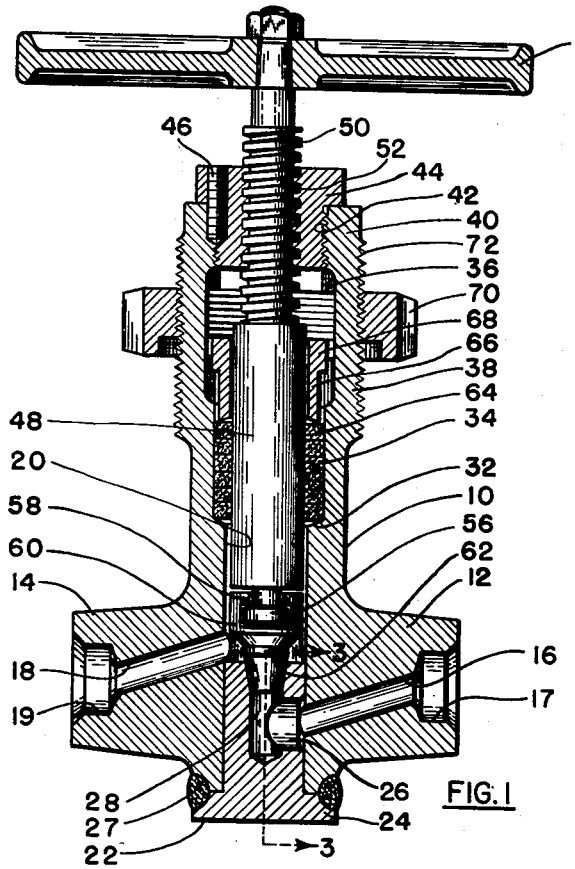
Fig. 1 is a vertical section of a valve embodying the invention.
Figure 2:
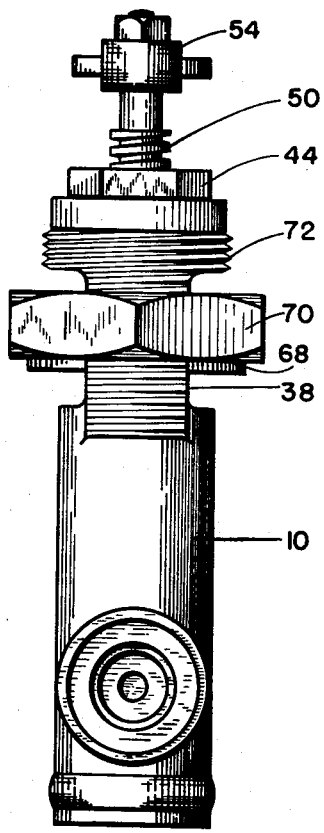
Fig. 2 is an end elevation of the valve shown in Fig. 1.
Figure 3:
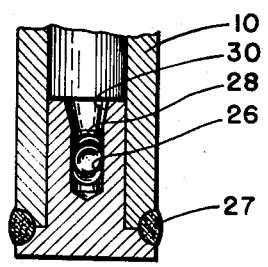
Fig. 3 is a partial sectional view taken on the line 3—3 of Fig. 1 looking in the direction indicated by the arrows.

Referring more particularly to the drawing, the valve shown in Figs. 1 to 3 inclusive comprises a valve body 10 of generally cylindrical form, having projections 12 and 14 extending laterally from opposite sides at one end thereof. The projections 12 and 14 are provided with openings 16 and 18 respectively, providing an inlet and an outlet for the valve body 10. In this embodiment, the inlet 16 and outlet 18 have enlargements 17 and 19 respectively, at their outer ends and substantially concentric with the projections within which they are formed; but the openings themselves are not concentric but diverge toward the valve stem opening to communicate therewith in spaced relation to each other. The body 10 is further provided with an axial valve stem opening 20 with which the inlet 16 and outlet 18 communicate.

A plug member 22 is inserted into the valve stem opening 20 adjacent the inlet and outlet openings to form a closure for the body at that end thereof. The plug member 22 may be secured in the valve stem opening in any suitable manner such as by pressing, shrinking or threading it therein or by any combination of these methods and may be provided with a head 24 secured in sealed engagement with the valve body 10 by welding as at 27. The junction of the inlet 16 and valve stem opening 20 is covered by the plug member 22 but the member does not extend a sufficient distance to cover the junction of the outlet 18. In order, therefore, to provide communication between the inlet 16 and the outlet 18 with the plug in position, a slot 26 may be formed in one side of the plug extending into a blind ended hole 28 projecting axially from the inner end of the plug. Preferably, the slot 26 is elongated sufficiently to provide communication with the inlet 16 regardless of the different longitudinal positions which the plug member 22 may occupy in the valve stem opening 20, thus compensating for discrepancies in manufacture.

A tapered valve seat 30 is formed on the inner open end of the axial hole 28 in the plug member 22 and, if desired, this valve seat may be surfaced with a suitable hard material. The valve stem opening 20 extends from the valve seat 30 for a short distance and connects with a shoulder 32 formed by the junction therewith of an enlarged opening or stuffing box 34. The space between the valve seat 30 and the stuffing box 34 forms the valve chamber. The other end of the stuffing box opens into a window 36 of a yoke portion 38 formed on the body and terminating in a hub 40 at the end of the body. The hub 40 is provided with a threaded bore 42 for the reception of a stem bushing 44 which may be locked in position by means of the set screw 46. The provision of the stem bushing 44 permits the use of a material having satisfactory properties as a bearing and thrust resisting element, but this member may be dispensed with if desired.

Extending into the valve stem opening 20 is a valve stem 48 having a threaded portion 50 which engages with a threaded bore 52 in the stem bushing 44. In the embodiment shown in the drawing, the threaded portion 50 may be reduced from the plain portion of the stem 48, due to the provision of the removable bushing 44, but would be made larger if the bushing were dispensed with in order to permit removal of the valve stem from this end of the body 10. The usual handle 54 may be secured on the end of the valve stem 48 beyond the threaded portion 50.

The valve stem 48 may be provided on its end with a reduced headed portion 56 adapted to loosely engage with a T slot 58 formed in a valve member 60. The valve member 60 has a tapered end 62 adapted to engage the valve seat 30 and control the flow of fluid from the inlet to the outlet passages in the valve body. As in the case of the valve seat 30 the tapered end 62 of the valve member may be surfaced with any suitable hard material.

Packing 64 may be housed within the stuffing box 34 and compressed therein by means of a packing gland 66. In order to permit such compression, this packing gland is provided with an elliptical head portion 68 which extends beyond the sides of the yoke 38 for engagement with a nut 70 operable on the threaded outer surfaces 72 of the yoke 38.

Figure 4:
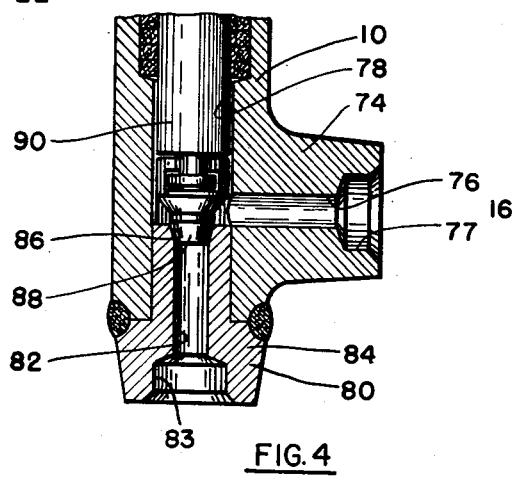
Fig. 4 is a fragmentary sectional view of another embodiment of the invention.

In the modification illustrated in Fig. 4 the valve body 10 is in the form of an angle type valve instead of the straight-through globe type illustrated in Figs. 1 to 3 inclusive. Accordingly, the body 10 is provided with a single projection 74 on one side thereof which is suitably bored to provide an outlet passage 76 from the valve stem opening 78 which extends axially through the valve body 10. The outlet 76 may be concentric with the enlargement or counterbore 77 formed therein and not at an angle thereto as in the previous embodiment. In this instance also, the plug member 80, which is secured within the lower end of the valve stem opening 78, does not form a closure therefor as in the previously described embodiment, but is provided with an axial opening therethrough forming an inlet passage 82 for the valve body. The inlet 82 and outlet 76 are thus substantially perpendicular to each other. In view of this construction, the head 84 of the plug member 80 is increased somewhat in length to provide sufficient amount of material to form the enlargement or counterbore 83 therein. As in the previously described embodiment, the plug member 80 may extend inwardly of the valve stem opening 78 sufficiently to terminate at the junction of the outlet 76 and valve stem opening 78. A valve seat 86 may be formed on the plug member 80 at this end. The remaining portion of the structure of this valve including the valve member 88 and valve stem 90 may be similar to that previously described and further description is deemed unnecessary.

In carrying out the purposes of this invention, the body 10 is preferably formed of wrought metal, such as a steel forging, with the window 36 and the yoke 38 forged therein. The inlet and outlet passages 16 and 18 may then be machined in the body 10, as may the valve stem opening 20, stuffing box 34 and the threaded opening 42 for the stem bushing. The plug member 22 is, as described, a separately formed element and may be completely finished, including the hard facing and grinding of the valve seat 30, before insertion and welding in the valve body 10. It will thus be apparent that manufacture of the valve is facilitated in many ways thus rendering the device economical to produce in quantity.

While the necessity for repair and replacement of parts in this embodiment of the invention is infrequent due to the simplified and substantial construction, provision is made for ready disassembly when desired. It will be apparent that upon operation of the packing nut 70 to relieve pressure of the packing against the stem and the removal of the set screw 46 from engagement with the stem bushing 44 and hub 40, the entire valve stem and valve member can be withdrawn as a unit with the bushing 44 through the packing and packing gland. Similarly, the assembly of the valve can be achieved by reversal of these few steps so that the assembly and disassembly of the valve is a matter of a few minutes.

From the foregoing description it will be apparent that the valve described is well able to withstand high pressures and high temperatures due to its rugged construction of wrought metal. The absence of a bonnet or other separable joint eliminates that element which in the past has been a fertile source of leakage. Moreover, although such joints have been eliminated in this construction, the valve can be put together and dismantled with facility equal or superior to a valve possessing the common form of jointed construction. That the invention may be embodied in other specific forms and materials will be apparent, it being understood that the structure described is merely illustrative of the manner in which the principles may be utilized and that comprehended within the invention are all such modifications as may fall within the scope of the appended claims.

I claim:

1. A valve body of wrought metal comprising a one-piece body and bonnet portion formed generally cylindrical from end to end and having an axial bore of uniform diameter extending from one end to the median portion thereof, said bore terminating at said median portion in a shoulder formed by one end of an enlarged opening for a stuffing box in said portion, oppositely disposed recessed portions interrupting the said generally cylindrical contour beyond said stuffing box and having a window therethrough providing access to said stuffing box, said recessed portions forming a yoke wrought integral with the one-piece body and bonnet portion, a hub surmounting said yoke and wrought integral therewith, and a lateral having an outlet communicating with said axial bore, said lateral being wrought integral with said one-piece body and bonnet portion, said axial bore being arranged to receive a plug member welded to the one-piece body and bonnet portion to serve as a valve seat adjacent said outlet.

2. A valve body of wrought metal, comprising a one-piece body and bonnet portion formed generally cylindrical from end to end and having an axial bore of uniform diameter extending from one end to the median portion thereof, said bore terminating at said median portion in a shoulder formed by one end of an enlarged opening for a stuffing box in said portion, oppositely disposed recessed portions interrupting the said generally cylindrical contour beyond said stuffing box and having a window therethrough providing access to said stuffing box, said recessed portions forming a yoke wrought integral with the one-piece body and bonnet portion, a hub surmounting said yoke and wrought integral therewith, and a pair of laterals projecting from opposite sides of said body and bonnet portion having inlet and outlet openings respectively communicating with said axial bore, said laterals being wrought integral with said one-piece body and bonnet portion, said axial bore being arranged to receive a plug member welded to the one-piece body and bonnet portion and forming a closure therefor, said axial bore providing communication between said inlet and outlet through a passage in said plug member the wall of which passage serves as a valve seat therebetween.

ARTHUR J. TROTT.